(12) United States Patent
Johansson et al.

(10) Patent No.: US 12,081,020 B2
(45) Date of Patent: Sep. 3, 2024

(54) CONTROL METHOD, COMPUTER PROGRAM PRODUCT, CONTROL SYSTEM AND USE

(71) Applicant: HITACHI ENERGY LTD, Zurich (CH)

(72) Inventors: Nicklas Johansson, Västerås (SE); Jan Svensson, Västerås (SE); Panagiotis Bakas, Västerås (SE); Roberto Alves, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/281,362

(22) PCT Filed: Feb. 24, 2022

(86) PCT No.: PCT/EP2022/054652
§ 371 (c)(1),
(2) Date: Sep. 11, 2023

(87) PCT Pub. No.: WO2022/189160
PCT Pub. Date: Sep. 15, 2022

(65) Prior Publication Data
US 2024/0097442 A1 Mar. 21, 2024

(30) Foreign Application Priority Data
Mar. 12, 2021 (EP) .................... 21162435

(51) Int. Cl.
*H02J 3/00* (2006.01)
*H02J 3/24* (2006.01)
*H02P 13/00* (2006.01)

(52) U.S. Cl.
CPC ............. *H02J 3/001* (2020.01); *H02J 3/241* (2020.01); *H02P 13/00* (2013.01)

(58) Field of Classification Search
CPC ..... H02J 3/001; H02M 1/007; H02M 3/33515
See application file for complete search history.

(56) References Cited

U.S. PATENT DOCUMENTS 10,422,846 B2 * 9/2019 Ruengeler ............ G01R 35/005
2006/0235574 A1 10/2006 Lapinski et al.

FOREIGN PATENT DOCUMENTS

| CN | 106026686 A | * 10/2016 | ............ H02M 3/335 |
| JP | 62-077023 A | 4/1987 | |

(Continued)

OTHER PUBLICATIONS

Marius Langwasser et al.: "Smart Transformer-based Frequency Support in Variable Inertia Conditions" from "2019 IEEE 13th International Conference on Compatibility, Power Electronics and Power Engineering (Cpepowereng), IEEE, Apr. 23, 2019 (Apr. 23, 2019), pp. 1-6, XP033627861" (Year: 2019).*

(Continued)

*Primary Examiner* — Yuhui R Pan
(74) *Attorney, Agent, or Firm* — Sage Patent Group

(57) ABSTRACT

A method for controlling an output voltage of at least one transformer in a power grid comprises providing the one transformer(s) with a power electronics converter and an output voltage controller, determining a grid frequency, comparing the grid frequency with a reference value, producing an error signal, applying the error signal as feedback to the controller, and generating a control action to cause the controller to change the output voltage of the transformer comprising a power electronics converter. The power electronics converter is an AC-AC converter, and the method comprises connecting the AC-AC converter to either a primary side or a secondary side of the transformer. The AC-AC converter has a first AC side and a second AC side and the method comprises connecting two terminals on the (Continued)

first AC side to a winding of the transformer, and connecting the second AC side to an external circuit line.

20 Claims, 3 Drawing Sheets

(56) References Cited

FOREIGN PATENT DOCUMENTS

| JP | 2004072864 A | 3/2004 |
|---|---|---|
| KR | 1020110076972 A | 7/2011 |
| KR | 1020110114697 A | 10/2011 |
| KR | 1020130100159 A | 9/2013 |

OTHER PUBLICATIONS

Tu et al. "Smart Transformer Modelling and Hardware in-the-loop Validation" from "2019 IEEE 10th International Symposium on Power Electronics for Distributed Generation Systems (PEDG), IEEE, Jun. 3, 2019 (Jun. 3, 2019), pp. 1019-1025, XP033601791, DOI:10.1109/PEDG.2019. 8807484" (Year: 2019).*

Rosso et al. "Analysis of the Interaction Among Power Converters Through Their Synchronization Mechanism" from "IEEE Transactions on Power Electronics, vol. 34, No. 12, Dec. 2019" (Year: 2019).*

International Search Report and Written Opinion of the International Searching Authority, PCT/EP2022/054652, mailed Jul. 4, 2022, 17 pages.

International of the International Preliminary Report on Patentability, PCT/EP2022/054652, mailed Jul. 10, 2023, 14 pages.

Tu Yuxiaoying, et al, "Smart Transformer Modelling and Hardware in-the-loop Validation", XP033601791, 2019 IEEE 10th International Symposium on Power Electronics for Distributed Generation Systems (PEDG), IEEE, Jun. 3, 2019, 7 Pages.

Langwasser, Marius, et al., "Smart Transformer-based Frequency Support in Variable Inertia Conditions", XP33627861, 2019 IEEE 13th International Conference on Compatibility, Power Electronics and Power Engineering (CPE-Powereng), IEEE, Apr. 23, 2019, 6 pages.

Baier, Carlos, et al., "Hybrid Transformers with Virtual Inertia for Future Distribution Networks", XP033669752, IECON 2019—45th Annual Conference of the IEEE Industrial Electronics Society, IEEE, Oct. 14, 2019, 6 pages.

Murad, Mohammed Ahsan Adib, et al., "Frequency Control Through Voltage Regulation of Power System Using SVC Devices", XP033699730, 2019 IEEE Power and Energy Society General Meeting (PESGM), IEEE, Aug. 4, 2019, 5 Pages.

Gu, Chunyang, et al.,"A Power Electronic Transformer (PET) with Multiport Bidirectional Resonant DC-DC Converters for Electric Traction Applications", XP033180894, 2015 IEEE Transportation Electrification Conference and Expo (ITEC), IEEE, Jun. 14, 2015.

Rehman, Abdur, et al., "Design and Analysis of PWM Inverter for 100KVA Solid State Transformer in a Distribution System", IEEE Access, vol. 7, XP011748908, Sep. 19, 2019, 17 pages.

Korean Decision for Grant and English Translation, Korean Application No. 10-2023-7030466, mailed Sep. 20, 2023, 6 pages.

Japanese Office Action and English Summary, Japanese Patent Application No. 2023-554823, mailed Apr. 10, 2024, 4 pages.

Chinese Office Action, Chinese Application No. 202280019541.1, mailed Apr. 9, 2024, 33 pages.

* cited by examiner

CONTROL METHOD, COMPUTER PROGRAM PRODUCT, CONTROL SYSTEM AND USE

CROSS REFERENCE TO RELATED APPLICATIONS

This application is a 35 U.S.C. § 371 national stage application of PCT International PCT/EP2022/054652 filed on Feb. 24, 2022, which claims priority to European Patent Application 21162435.8, filed on Mar. 12, 2021, the disclosures and content of which are incorporated by reference herein in their entireties.

TECHNICAL FIELD

The present disclosure concerns a method, a computer program product, and a system for controlling an output voltage of at least one transformer in a power grid. The present disclosure also concerns the use of such a method, computer program product, or system for controlling the active power consumption within a power grid, i.e., any interconnected network for delivering electricity from at least one producer to at least one consumer, such as a transmission and distribution network.

BACKGROUND

Power grids consist of electrical power generating stations that are often located near energy resources, electrical substations for stepping electrical voltage up for transmission, or down for distribution, high voltage transmission lines that carry electric power from distant energy sources to demand centers, and distribution lines that supply electrical power to individual customers, such as residential and commercial buildings and industrial parks.

Centralized power stations, such as coal-fired, gas- or nuclear-powered plants or hydroelectric dams, often require electrical energy to be transmitted over long distances. Electrical energy may however be generated by distributed energy resources (DER) i.e., decentralized and modular technologies, which may be located close to the load that they serve. Due to the increasing integration of renewable energy sources, such as solar power, wind power, biogas, biomass and geothermal power, more power is being injected into alternating current (AC) power grids using power electronic converters. This type of power injection is called non-synchronous generation (NSG), whereby renewable energy sources are non-synchronously connected to the power grid, unlike traditional generation based on large synchronous generators providing the system inertia.

In some power grids, the penetration of NSG can be very high during certain parts of the year. However high levels of NSG in a power grid bring challenges when it comes to frequency stability, voltage stability, short-circuit power levels and harmonic stability.

To understand the frequency control issue in power grids with a high penetration of NSG it is instructive to review synchronous machine dynamics. A synchronous power grid may, through a crude approximation, be seen as a single synchronous machine with a turbine, where mechanical power is being generated, and which is connected to an electrical load.

The electro-mechanical equation of a single synchronous machine (SM) can be written as:

$$P_m - P_e = \omega_m J \frac{d\omega_m}{dt}.$$

where J is the moment of inertia [kg*m²], $\omega_m$ is the rotational speed of the machine [rad/s], $P_m$ is the mechanical power supplied from the turbine [W], and $P_e$ is the output electrical power [W].

In an electrical power grid, the grid frequency needs to be constantly controlled by adjusting the generation ($P_m$) with respect to the instantaneous load ($P_e$) in the grid. If the mechanical power supplied from the turbine is greater than the output electrical power ($P_m > P_e$), the grid frequency will increase. If the mechanical power supplied from the turbine is less than the output electrical power ($P_m < P_e$), the grid frequency will decrease. The grid frequency is usually maintained within a narrow frequency band around the nominal grid frequency (which is 50 Hz in European power grids, and 60 Hz in the US) by automatically controlling power generation.

In power grids with a high penetration of NSG, synchronous generation is disconnected from the grid and the rotating inertia in the grid thereby decreases. This means that the effective moment of inertia, J, in the equation given above is reduced. This in turn leads to a faster change in the frequency if a mismatch between generated and consumed power occurs (for example due to a trip event of one large generator in the grid). In order to keep a grid frequency within the same range for a grid with low inertia, a faster regulation of the active power balance is required.

In order to address the challenge of frequency control, which is related to the low amount of rotating inertia in NSG-rich grids, Transmission System Operators are using several mitigation methods. One such mitigation method utilizes fast frequency control units, which are capable of responding very quickly when the grid frequency deviates outside a dead-band, i.e., a band of input values in a control system where the output is zero (the output is 'dead'—no action occurs). Examples of units which may provide fast frequency response (FFR) are Battery Energy Storage Units (BESS) and HVDC links.

Another mitigation method that can be used to control the frequency in a power grid is Demand Response, which is defined by the Federal Energy Regulatory Commission (FERC) in the US as: "Changes in electric usage by end-use customers from their normal consumption patterns in response to changes in the price of electricity over time, or to incentive payments designed to induce lower electricity use at times of high wholesale market prices or when system reliability is jeopardized." Controlled load shedding is widely adopted as a last alternative to save a power grid from a black-out after severe and un-anticipated faults in the power grid.

Rapid control of the load in a power grid, i.e., Fast Demand Response, is an alternative to providing Fast Frequency Response to improve the frequency containment in grids with increasing levels of NSG and reduced levels of rotating inertia. For example, the PhD thesis by Yue Guo entitled "Capability Assessment of VAr Support and Demand Response to Transmission Network using Flexible Tap Changing Techniques in Distribution Networks", which was published in 2017 and which is available from the University of Manchester Library, discusses the flexible tap changing techniques that utilise parallel transformers in distribution networks to provide reactive power absorption and demand response services for transmission systems.

The author of this PhD thesis found that a demand reduction could be achieved without violating the voltage limits in the distribution grid, and voltage reductions in the range of 1-4% were recommended. The effect on the loads is directly related to the voltage dependence of the loads in the distribution grid. Different load characteristics were investigated as part of this PhD work and the active power demand change resulting from the voltage reduction applied was found to be roughly between 0 (for constant active power load) and 5% (for constant impedance load). In many cases, a load reduction of a couple of percent could be achieved without violating the voltage constraints in the distribution grid in the study.

Additionally, the article by A. Ballanti and L. F. Ochoa, entitled "Initial assessment of voltage-led demand response from UK residential loads," which was published in *IEEE Power & Energy Society Innovative Smart Grid Technologies Conference (ISGT)*, 2015, pp. 1-5 presents and applies two load modelling methodologies, time independent and time varying, to a single primary substation and then extends the methodologies to the entire distribution network operator area. The results for the time-varying model, a purely residential load, and a 3% voltage reduction during a winter day showed that it could be possible to achieve an aggregated peak reduction exceeding 150 MW i.e., more than 3%.

These prior art documents show that some level of slow control of the load in a distribution grid can be achieved by controlling the On-Load Tap Changer (OLTC) of distribution transformers to regulate the voltage without violating the voltage control requirements of the power grid. However, given the slow time response of an OLTC, a standard distribution transformer with an OLTC cannot provide a rapid demand response and thus participate in the fast frequency control action of a power grid which is increasingly desired in today's power grids.

The article entitled "Smart Transformer Modelling and Hardware in-the-loop Validation" by Tu Yuxiaoying et al. (2019 IEEE 10$^{th}$ International Symposium on Power Electronics for Distributed Generation Systems (PEDG), 3 Jun. 2019, page 1019-1025) discloses a solid-state transformer with a fully rated AC/DC, DC/DC and DC/AC stages to vary the voltage on the load side to achieve a variation in the load power which is then controlled to support the main grid frequency.

The article entitled "Smart Transformer-based Frequency Support in Variable Inertia Conditions" by Marius Langwasser et al. (IEEE 13$^{th}$ International Conference on Compatibility, Power Electronics and Power Engineering, 23 Apr. 2019, pages 1-6) discloses a solid-state transformer with fully rated AC/DC and DC/AC stages to control the downstream load voltage in order to support the grid frequency.

The article entitled "Hybrid Transformers with Virtual Inertia for Future Distribution Networks" by Carlos R. Baier et al. (45$^{th}$ Annual Conference of the IEEE Industrial Electronics Society, vol. 1, 14 Oct. 2019, pages 6767-6772) discloses a fractionally rated AC/DC-DC/AC converter arrangement connected in a parallel-like manner across a main transformer. Additional DC-side energy storage is used in the converter (an oversized DC capacitor) to provide active power/frequency support. The hybrid transformer described in this article is a combination of a dc link (ac-dc-ac) connected in parallel with a transformer. The converter has connections to both sides of the transformer.

The article entitled "Frequency Control Through Voltage Regulation of Power System Using SVC Devices" by Mohammed Ahsan Adib Murad et al. (IEEE Power & Energy Society General Meeting (PESGM), 4 Aug. 2019, pages 1-5) focuses on voltage-based frequency control (VFC) of Static Var Compensators (SVCs) (shunt compensation). The proposed VFC schemes utilize exclusively local voltage and frequency measurements. The authors found that simulation results indicated that even a small number of SVCs can effectively support the primary frequency control without worsening the voltage response of a large network.

SUMMARY

An object of the present disclosure is to provide an improved method for controlling an output voltage of at least one transformer in a power grid.

This object is achieved by a method comprising the method steps recited in claim 1. The method comprises the steps of providing the at least one transformer with a power electronics converter and an output voltage controller, determining (i.e., measuring, estimating, calculating or receiving) a grid frequency of the power grid, comparing the determined grid frequency with a reference value, producing an error signal corresponding to the difference between the determined grid frequency and the reference value, applying the error signal as feedback to the output voltage controller, and generating a control action to cause the output voltage controller to change the output voltage of the at least one transformer comprising a power electronics converter to limit the difference between the grid frequency and the reference value, i.e., to limit the maximum frequency deviation, whereby the power electronics converter is an AC-AC converter and the method comprises the steps of connecting the AC-AC converter to either a primary side or a secondary side of the transformer, whereby the AC-AC converter has a first AC side and a second AC side and the method comprises the step of connecting two terminals on the first AC side in parallel to a winding or a part of a winding of the transformer, and connecting the second AC side directly to, or in series with an external circuit line.

Such topologies make it possible to use a power electronics converter with a smaller (fractional) rating than the total throughput power of the at least one transformer. This is in contrast to the topologies disclosed in the prior art which comprise either a fully rated converter (i.e., a converter with a rating which equals the throughput power of the transformer), or which disclose a converter with a fractional rating, but which has connections to both sides of the transformer. The topologies described above will consequently result in improvements in implementation, control and costs compared to known topologies.

This method controls the output voltage of a power electronics enhanced transformer (PEET) using a measurement of the grid frequency such that the output voltage of the PEET is a function of the grid frequency. When the grid frequency falls below a predetermined reference value, or lies outside a predetermined range of predetermined frequency values, such as a pre-defined dead-band, the output voltage of the at least one transformer may be lowered, and when the grid frequency rises above a predetermined reference value or a predetermined range of grid frequency values, the output voltage of the at least one transformer may be increased.

The objective of the control method according to the present disclosure is namely to develop a model or algorithm governing the application of power grid system-inputs to drive the system to a desired state, while minimizing any delay, overshoot, or steady state error and ensuring a level of control stability, with the aim of achieving a degree of optimality. To do this, a control method or control system with the requisite corrective behaviour is required. The control method and control system according to the present disclosure use feedback control to monitor a process variable, i.e., the grid frequency, by taking measurements of the grid frequency using a sensor or by receiving a grid frequency estimate from a remote location for example. A local controller may be used to estimate the relationship between the output voltage of a transformer in the power grid and the active power drawn by a load downstream of the transformer in order to know the demand response active power variation that can be achieved by a voltage change in advance.

According to an embodiment of the present disclosure, the power electronics converter has a rating (fractional rating) that is smaller than the total throughput power of a transformer of the at least one transformer, such as a main transformer of the at least one transformer.

According to an embodiment of the present disclosure, the AC-AC converter comprises a DC bus.

According to an embodiment of the present disclosure, the transformer comprises a plurality of windings, such as two, three, four or more windings, which are isolated from each other. The method thereby comprises the step of connecting two terminals on the first AC side of the AC-AC converter in parallel to a winding or a part of one of the windings of the transformer.

According to an embodiment of the present disclosure, the step of determining the grid frequency of the power grid comprises the step of estimating a local power grid frequency using a phase-locked loop (PLL) of the power electronics converter.

Alternatively, the step of determining the power grid frequency of the power grid comprises the step of the output voltage controller receiving a power grid frequency estimation from a remote location, such as from a control center of a Transmission Service Operator, via a communication channel. The power grid frequency estimation is namely received from a remote location rather than being measured locally.

According to an embodiment of the present disclosure, at least one method step or the entire method may be carried out at a remote location whereby the control action is sent to the output voltage controller via a communication channel. A single control system may namely be used to control the output voltage of a plurality of transformers located in different places in a power grid.

According to an embodiment of the present disclosure, the method comprises the step of continuously determining an active throughput power and the output voltage of the at least one transformer so as to estimate a voltage dependence of a downstream load in the power grid.

According to an embodiment of the present disclosure, the method comprises the step of controlling a plurality of transformers connected in parallel, whereby the control action to change the output voltage of the plurality of transformers is sent to the plurality of transformers at the same time. Depending on the communication between the output voltage controller and the local power electronics converters of the plurality of transformers, the method may comprise the step of sending a synchronization signal to synchronize the clocks of the local output voltage controllers of the power electronics converters of the plurality of transformers.

According to an embodiment of the present disclosure, the step of determining the grid frequency comprises the step of determining a grid frequency at a plurality of different places in the power grid in order to increase the accuracy of the grid frequency determination.

The present disclosure also concerns a computer program product that comprises a computer program containing computer program code means arranged to cause a computer or a processor to execute all of the steps of a method according to any of the embodiments of the present disclosure, stored on a computer-readable medium or a carrier wave.

The present disclosure further concerns a control system for controlling an output voltage of at least one transformer in a power grid. The at least one transformer comprises a power electronics converter and the control system comprises an output voltage controller and a sensor configured to determine a grid frequency of the power grid, i.e., the sensor is configured to measure, estimate, or receive the grid frequency of the power grid. The control system is configured to compare the determined grid frequency with a reference value, produce an error signal corresponding to the difference between the determined grid frequency and the reference value and apply the error signal as feedback to the output voltage controller, and cause the output voltage controller to generate a control action to change the output voltage of the at least one transformer comprising a power electronics converter to limit the difference between the grid frequency and the reference value, whereby the power electronics converter is an AC-AC converter that is connected to either a primary side or a secondary side of the transformer, whereby the AC-AC converter has a first AC side and a second AC side and two terminals on the first AC side are connected in parallel to a winding or a part of a winding of the transformer, and the second AC side is connected directly to, or in series with an external circuit line.

The reference value may be a nominal grid frequency or a value indicating a maximum or minimum allowed grid frequency, such as an upper or lower limit of a dead-band frequency range.

According to an embodiment of the present disclosure, the power electronics converter has a rating that is smaller than the total throughput power of a main transformer of the at least one transformer, such as a main transformer of the at least one transformer.

According to an embodiment of the present disclosure, the AC-AC converter comprises a DC bus.

According to an embodiment of the present disclosure, the transformer comprises a plurality of windings, such as two, three, four or more windings, which are isolated from each other. The two terminals on the first AC side of the AC-AC converter of the control system are thereby connected in parallel to a winding or a part of one of the windings of the transformer.

According to an embodiment of the present disclosure, the power electronics converter comprises a phase-locked loop (PLL) configured to determine the grid frequency of the power grid by estimating a local power grid frequency.

According to an embodiment of the present disclosure, the control system comprises a communication channel configured to receive a power grid frequency estimation from a remote location, such as from a control center of a Transmission Service Operator, and the control system is configured to determine the power grid frequency of the power grid using the power grid frequency estimation.

According to an embodiment of the present disclosure, the control system comprises a communication channel that is configured to receive the generated control action from a remote location, such as from a control center of a Transmission Service Operator.

According to an embodiment of the present disclosure, the control system comprises an instrument that is configured to continuously measure an active throughput power and the output voltage of the at least one transformer, and the control system is configured to estimate a voltage dependence of a downstream load in the power grid using the measurements.

According to an embodiment of the present disclosure, the control system is configured to control the output voltage of a plurality of transformers that are connected in parallel and that comprise a power electronics converter, and the output voltage controller is configured to send the control action to change the output voltage of the plurality of transformers to the plurality of transformers at the same time. Depending on the communication between the output voltage controller and the local power electronics converters of the plurality of transformers, the control system may be configured to send a synchronization signal to synchronize the clocks of the local output voltage controllers of the power electronics converters of the plurality of transformers.

The present disclosure also concerns the use of a method, or a computer program product or a control system according to any of the embodiments described herein for controlling the active power consumption within a power grid.

BRIEF DESCRIPTION OF THE DRAWINGS

The present disclosure will hereinafter be further explained by means of non-limiting examples with reference to the appended figures where.

It should be noted that the drawings have not necessarily been drawn to scale and that the dimensions of certain features may have been exaggerated for the sake of clarity.

DETAILED DESCRIPTION

Figure 1:
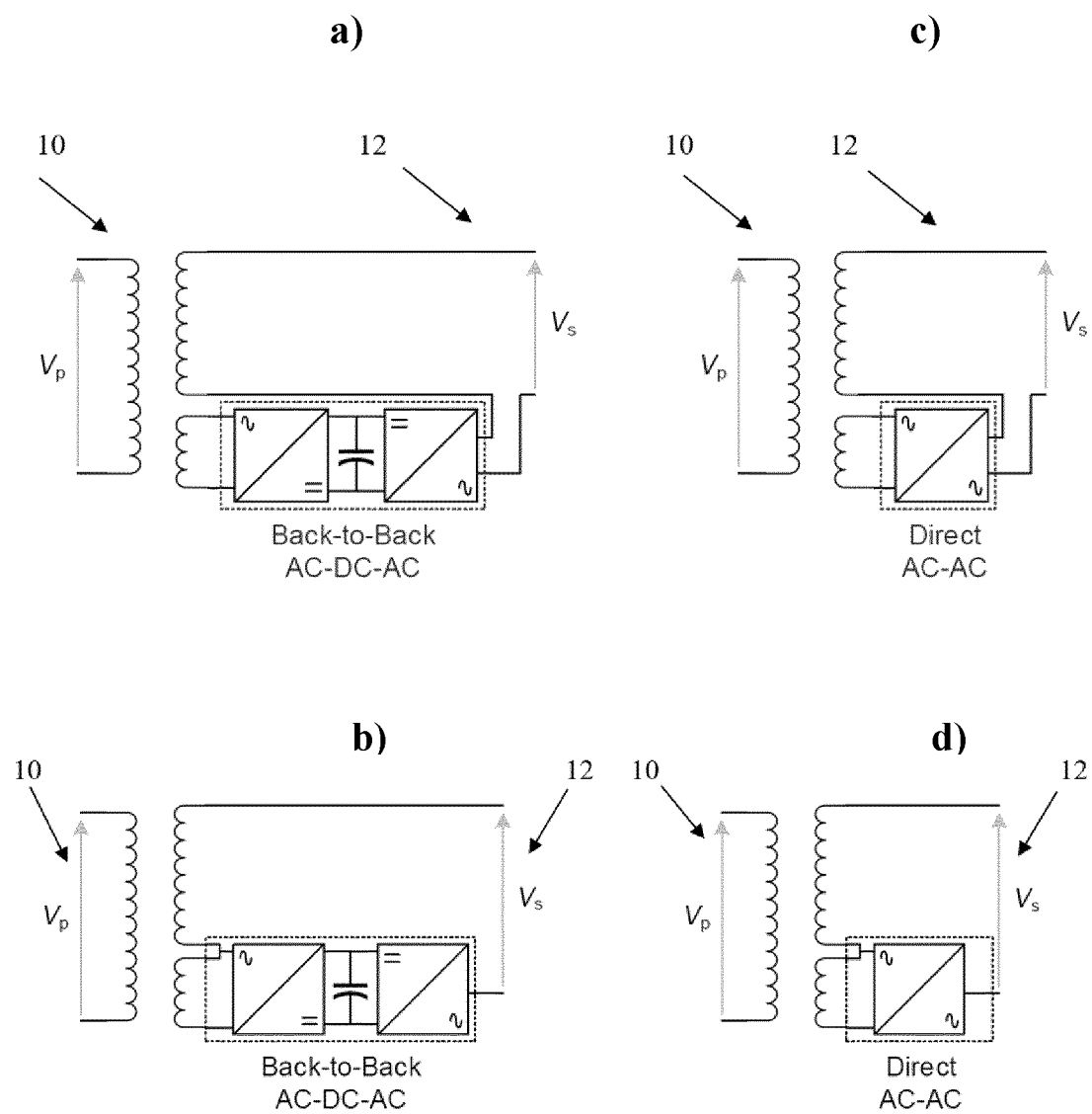
FIG. 1 shows four topologies of PEETs.

FIG. 1 shows the four topologies of transformers 10 with a power electronics converter 12, namely four power electronics enhanced transformers (PEET), whereby the power electronics converter 12 is an AC-AC converter, optionally comprising a DC bus. The AC-AC converter is connected to either a primary side or a secondary side of the transformer 10. The AC-AC converter has a first AC side and a second AC side and two terminals on the first AC side are connected in parallel to a part of a winding of the transformer 10, and the second AC side is connected directly to, or in series with an external circuit line.

FIG. 1a shows an AC-AC converter topology which comprises a DC bus. The voltage terminals on the first AC side are connected in parallel to one of the windings of the transformer 10, whereby the transformer 10 has two windings on the PEET side of the transformer 10 which are isolated from each other. The voltage terminals on the second AC side of the AC-AC converter are connected in series with the external circuit line.

FIG. 1b shows an AC-AC converter topology which comprises a DC bus. The voltage terminals on the first AC side are connected in parallel to a part of the winding of the transformer 10. The voltage terminal on the second AC side of the AC-AC converter is connected directly to the external circuit line.

The topologies shown in FIGS. 1a-1d comprise fractionally rated converter arrangements connected across a transformer 10.

FIG. 1c shows an AC-AC converter topology in which the voltage terminals on the first AC side are connected in parallel to one of the windings of the transformer 10, whereby the transformer 10 has two windings on the PEET side of the transformer 10 which are isolated from each other, and the voltage terminals on the second AC side of the AC-AC converter are connected in series with the external circuit line.

FIG. 1d shows an AC-AC converter topology in which the voltage terminals on the first AC side are connected in parallel to a part of the winding of the transformer 10 and the voltage terminal on the second AC side of the AC-AC converter is connected directly to the external circuit line.

One or more filters may be included or omitted depending on application requirements.

The present disclosure uses a combination of series active/reactive compensation and shunt reactive compensation in the topologies shown in FIGS. 1a) and 1b). This means that two types of compensation are simultaneously combined in a single device.

The topologies shown in FIGS. 1c) and 1d) only allow the voltage to be changed by injecting a voltage in series and aligning with the transformer voltage.

A power electronics converter 12 as described herein may comprise any suitable power electronic components such as SCRs, TRIACs, IGBTs, to control and convert electric power. Silicon-based semiconductor devices and/or wide-band gap semiconductor devices (e.g., silicon carbide) can be used in a power electronics converter 12. An advantage of the latter type of semiconductor device is that it can be switched faster, which benefits the response time of the power electronics converter 12 and the size of the filters which may be used. Faster switching can namely lead to a lower response time and thus a faster regulation of frequency, as well as more compact filters.

According to an embodiment of the disclosed subject matter, the power electronics converter 12 is an AC to AC converter that connects an alternating current source to an alternating current load by controlling amount of power supplied to the load. The power electronics converter 12 converts the AC voltage at one level to the other by varying its magnitude as well as frequency of the supply voltage. For AC voltages of the same frequency, the power electronics converter 12 can vary also the phase of the AC voltage.

Such a power electronics converter 12 may be used in uninterrupted power supplies, high power AC to AC transmission, or renewable energy conversion systems.

By replacing an on-load tap changer (OLTC) of a transformer with a power electronics converter 12 to regulate the voltage on the secondary side of the transformer 10, the inventors have found that it is possible to control the output voltage of the transformer 10 much faster than with an OLTC solution.

Compared to a transformer with an OLTC, the power electronics enhanced transformer (PEET) used in the method according to the present disclosure has a much faster response time when it comes to regulating the voltage on the low voltage (LV) side of the transformer 10. This enables the PEET to provide a very rapid demand response when required. The output voltage on the LV side of the PEET may be very quickly regulated to achieve a demand response in an active power load. A voltage reduction which leads to a load reduction could for example be rapidly applied when the grid frequency in a power grid is reduced below a predetermined reference value, such as a threshold value according to the requirements of a Transmission System Operator for an FFR service.

It should be noted that the power electronics enhanced transformer (PEET) used in the method according to the present disclosure will also have a much faster response time when it comes to regulating the voltage on the high voltage (HV) side of a transformer 10 if the power electronics converter 12 is connected to the high voltage (HV) side of the transformer 10. In all of the topologies shown in FIG. 1, the power electronics converters 12 can therefore either be connected to the LV side or the HV side of the transformer 10. From a compactness perspective, it is preferable to connect the power electronics converters 12 to the LV side of the transformer 10.

Furthermore, the control system according to the present disclosure may be cheaper to implement than a conventional Battery Energy Storage Unit (BESS) since there is no need for energy storage.

Figure 2:
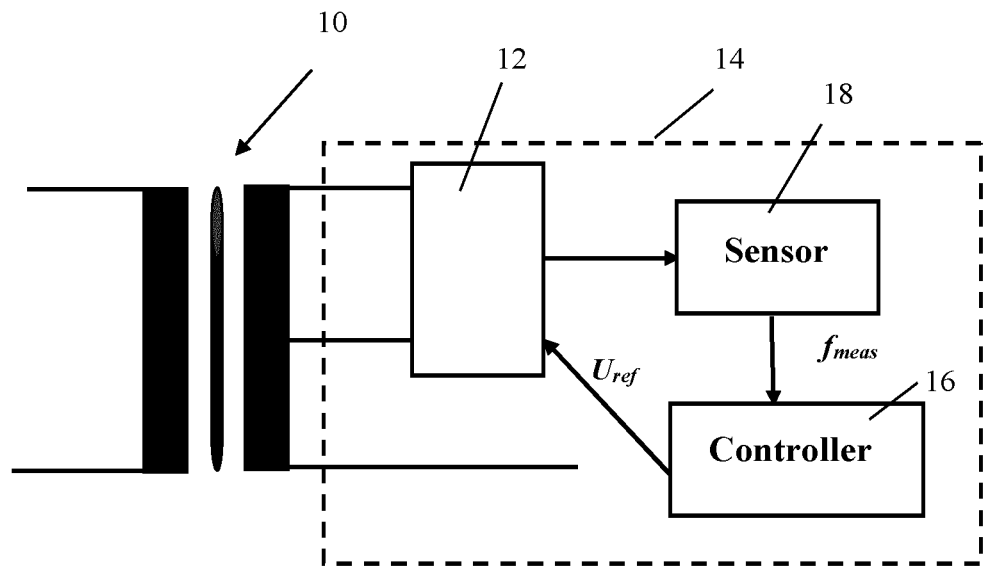
FIG. 2 schematically shows a system for controlling the output voltage of a PEET utilizing local grid frequency determination according to an embodiment of the present disclosure, FIG. 3 schematically shows a system for controlling the output voltage of a PEET utilizing remote grid frequency determination according to another embodiment of the present disclosure.

FIG. 2 schematically shows a control system 14 for controlling the output voltage of a PEET utilizing local grid frequency determination according to an embodiment of the disclosed subject matter. The system 14 comprises an output voltage controller 16, which may be considered to be an FFR controller, and a sensor 18 for measuring a local grid frequency, $f_{meas}$. The local grid frequency, $f_{meas}$, may for example be estimated by a phase-locked loop (PLL) of the power electronics converter 12 of the PEET 10. The grid frequency $f_{meas}$, may also be determined a plurality of different places in the power grid and an average value may be determined in order to improve the accuracy of the grid frequency determination.

The transformer 10 with a power electronics converter 12 as described herein may be part of a power grid that comprises distributed energy resources (DER), such as distributed renewable energy resources. The power grid may supply the demand of a one or more customers and may comprise at least one controllable load.

The control system 14 is configured to compare the measured grid frequency, $f_{meas}$, with a reference value for the grid frequency. The reference value may for example be the nominal frequency of the power grid, such as 50 Hz. The system 14 is configured to produce an error signal corresponding to the difference between the determined grid frequency, $f_{meas}$, and the reference value, 50 Hz, and apply the error signal as feedback to the output voltage controller 14. If the grid frequency, $f_{meas}$, lies outside a predefined dead-band, such as below 49.9 Hz or above 50.1 Hz indicating that an event, such as a trip event of a large generator in the power grid may have occurred, the control system 14 is configured to generate a control action to cause the output voltage controller 14 to change the output voltage of the PEET 10 to limit the difference between the grid frequency, $f_{meas}$, and the reference value. Primary control may be used to stabilize the grid frequency, $f_{meas}$, secondary control may be used to bring the grid frequency $f_{meas}$, back to the nominal value and restore the power reserve of the generators used for the primary frequency control, and tertiary control may be used to restore the power reserve of the generators used for the secondary frequency control.

If the measured grid frequency, $f_{meas}$, lies within the range 49.9 Hz to 50.1 Hz, no control action will be generated. A "control action" as used in this document may therefore be "no action", i.e., the absence of any action to change the output voltage of the transformer 10.

If a control action to change the output of the transformer 10 is necessary, the output voltage (with the reference value $U_{ref}$) on the low voltage side of the PEET 10 may then be very quickly regulated to achieve a demand response in the active power load.

Control actions from other controllers, such as the frequency governors of generators and possibly other demand response schemes, may be used bring the grid frequency to the same value as the reference value, or to within a predetermined deviation from the reference value.

Figure 3:
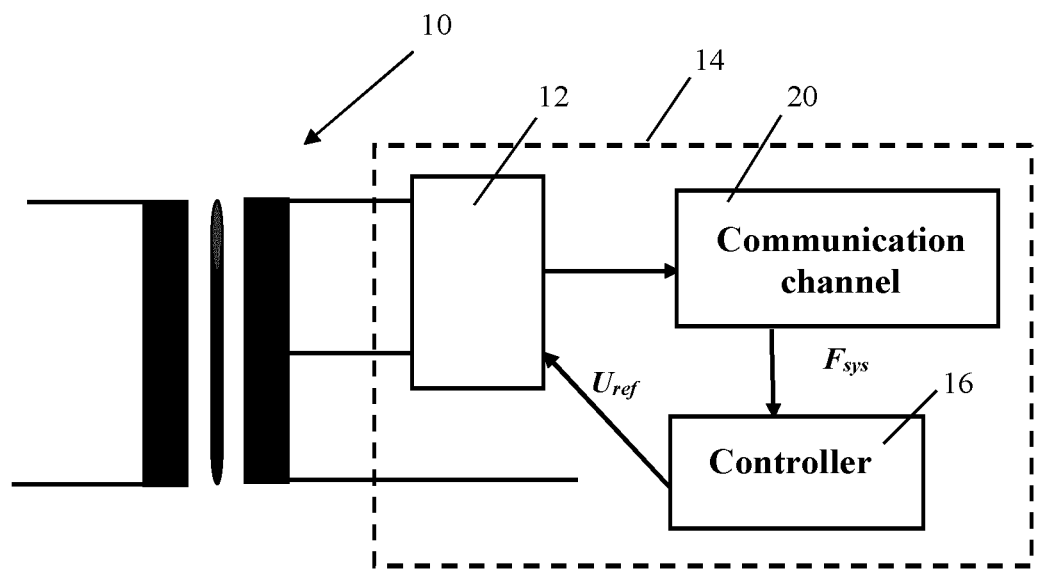

FIG. 3 schematically shows a system 14 for controlling the output voltage of a PEET utilizing a remotely determined grid frequency, $f_{sys}$, according to another embodiment of the disclosed subject matter. The control system 14 comprises a communication channel that is configured to receive a power grid frequency estimation, $f_{sys}$, from a remote location, such as from a control center of a Transmission Service Operator, and said control system 14 is configured to determine the power grid frequency of the power grid using that power grid frequency estimation. The grid frequency is namely the same throughout the power grid, with the exception of local short-term swings. At every moment the amount of electricity that is generated by the electrical power generating stations of the power grid must be equal to the amount of energy that is taken from the grid by the consumers.

A control system 14 according to the present disclosure may comprise both a sensor 18 for utilizing local grid frequency, $f_{meas}$, and a communication channel 20 for utilizing remote grid frequency, $f_{sys}$.

A communication channel 20 may also be used to receive a control action from a remote location, whereby the steps of a control method according to the present disclosure are carried out at a remote location.

It should be noted that the components of a control system 14 according to the present disclosure need not necessarily be located at the same location. The control system 14 may comprise a single unit, or a plurality of units for carrying out the steps of the method according to the present disclosure located in one or more locations.

It will be important to have an estimate of the voltage dependence of the loads in the power grid in which the transformer 10 with a power electronics converter 12 is connected in order to know how much demand response is available at any given time. According to an embodiment of the disclosed subject matter, the control system 14 comprise an instrument for continuously determining an active throughput power and the output voltage of the at least one transformer 10 so as to estimate a voltage dependence of a downstream load in the power grid. The aim of such a method step may for example be to determine the exponent np in the equation below based on measurements of the output voltage of the transformer 10 and the throughput power P of the transformer 10, $$P = P_0 \left(\frac{V}{V_0}\right)^{np}$$

where $V_0$ is the nominal voltage and $P_0$ is the base power.

$P_0$ will continuously change in the power grid since loads are constantly switched on and off. It is therefore most reliable to use the step responses in the active power obtained when the transformer 10 is controlled to change the output voltage as the main input to the estimation of the load voltage dependence. In many cases, $P_0$ may be regarded as a constant during a short time before and after the transformer output voltage is changed. The response recorded in voltage and power during this time may then be used to estimate the load characteristics.

An uncertainty will always exist in the forecasted assessment of the available demand response capability accessible by the methods according to the present disclosure. The amount of active power response (e.g. load reduction) will be dependent on the loading of a transformer at the point in time of the FFR activation and the voltage dependence of the downstream load. The load patterns in a power grid are normally continuously monitored and forecasted. This information may be used together with previous knowledge of the range of the load voltage dependence characteristics and potentially also on-line estimation data of the same, in order to get a good estimate of the available demand response capability unlocked by the transformer 10.

According to an embodiment of the disclosed subject matter, a control system 14 may be used to control a plurality of transformers 10 connected in parallel, whereby the control action to change the output voltage of the plurality of transformers 10 is sent to the plurality of transformers at the same time.

Limitations of a method according to the present disclosure may exist in cases where a PEET is connected in parallel to one or more regular transformers equipped with OLTCs. In such a case, it may not be suitable to change the output voltage of the PEET quickly as this will result in a difference in the secondary side voltage of the PEET compared with the regular transformers connected in parallel (since OLTCs cannot be controlled as quickly as the PEET). This may cause circulating currents between the transformers which may be unacceptable in some cases. However, in the case where a plurality of PEETs are connected in parallel there should be no such issue since the secondary side voltage of all of the PEETs can be changed at the same time.

Figure 4:
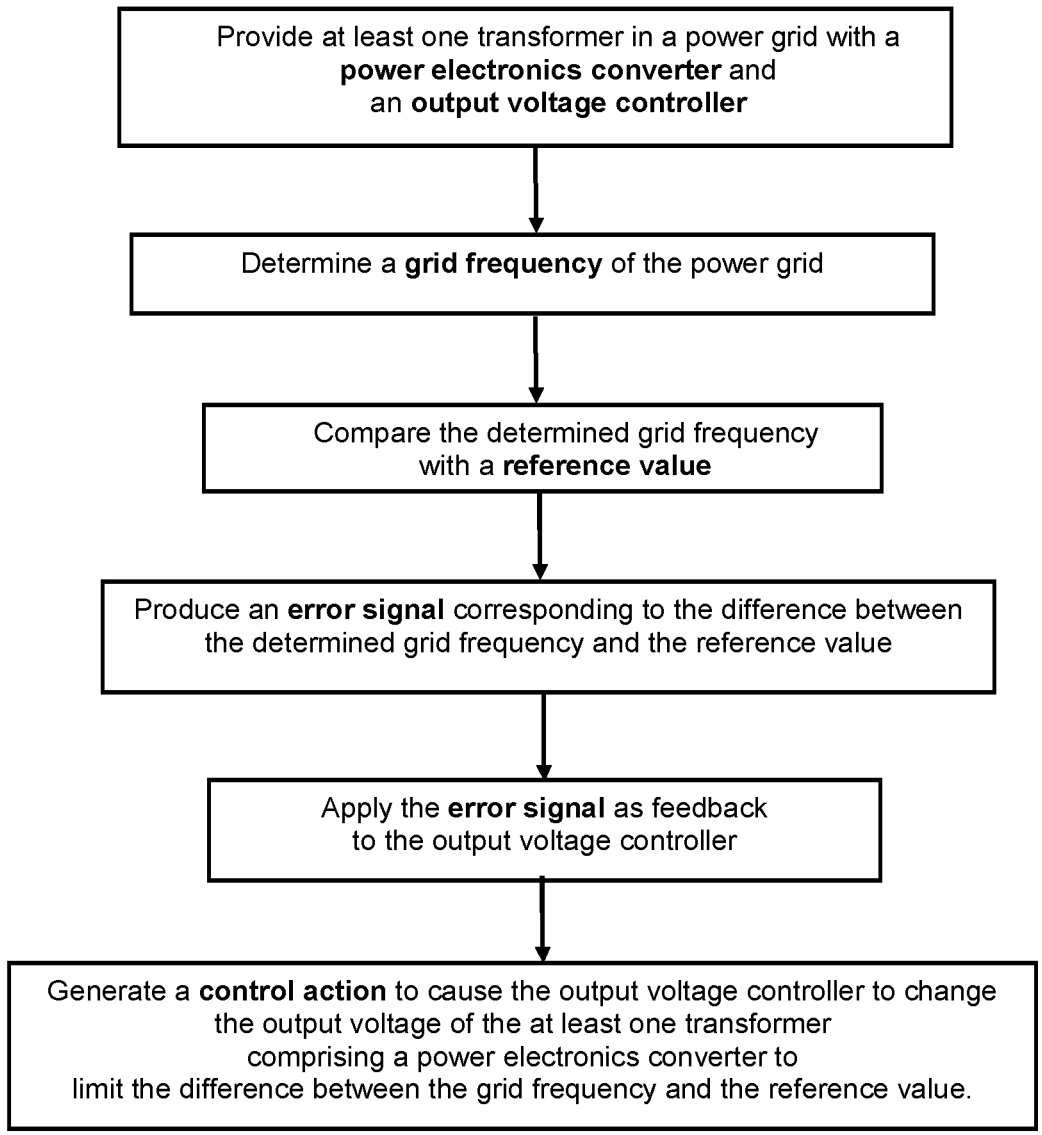
FIG. 4 is a flow diagram showing the steps of a method according to an embodiment of the present disclosure.

FIG. 4 shows the steps of a method for controlling an output voltage of at least one transformer 10 in a power grid. A computer program product may be used to cause a computer or a processor to execute all of the steps of the method. The method provides a decentralized control strategy for power grid components, which utilizes the change in local or remote grid frequency to control the active power consumption within the power grid. A transformer 10 with a power electronics converter 12 that is controlled using a method according to the present disclosure allows restricted active power flow to a power grid at a desired value.

Further modifications of the disclosed subject matter within the scope of the claims would be apparent to a skilled person.

The invention claimed is:

1. A method for controlling an output voltage of at least one transformer in a power grid, whereby said method comprises the steps of providing said at least one transformer with a power electronics converter, to thereby provide at least one power electronics enhanced transformer (PEET), and an output voltage controller, determining a grid frequency of said power grid, comparing said determined grid frequency with a reference value, producing an error signal corresponding to the difference between said determined grid frequency and said reference value, applying said error signal as feedback to said output voltage controller, and generating a control action to cause said output voltage controller to change the output voltage of said at least one transformer comprising a power electronics converter to limit the difference between the grid frequency and the reference value, whereby said power electronics converter is an AC-AC converter and said method comprises the steps of connecting said AC-AC converter to either a primary side or a secondary side of said transformer, whereby said AC-AC converter has a first AC side and a second AC side and said method comprises the step of connecting two terminals on said first AC side in parallel to a winding or a part of a winding of said transformer, and connecting said second AC side directly to, or in series with an external circuit line, wherein said at least one PEET transformer has one of the following topologies:
   a) voltage terminals on said first AC side are connected in parallel to one of the windings of said transformer, whereby said transformer has two windings on a PEET-side of said transformer which are isolated from each other, and voltage terminals on said second AC side of said AC-AC converter are connected in series with said external circuit line,
   b) voltage terminals on said first AC side are connected in parallel to a part of the winding of said transformer and the voltage terminal on said second AC side of said AC-AC converter is connected directly to said external circuit line, wherein the winding is the only winding on a PEET-side of the transformer and said part of the winding is a portion that is less than an entirety of the winding.

2. A method according to claim 1, wherein said power electronics converter has a rating that is smaller than total throughput power of a main transformer of said at least one transformer.

3. A method according to claim 1, wherein said AC-AC converter comprises a DC bus.

4. A method according to claim 1, wherein said transformer comprises a plurality of windings that are isolated from each other.

5. A method according to claim 1, wherein said step of determining said grid frequency of said power grid comprises the step of estimating a local power grid frequency ($f_{meas}$) using a phase-locked loop (PLL) of said power electronics converter.

6. A method according to claim 1, wherein said step of determining said power grid frequency of said power grid comprises the step of said output voltage controller receiving a power grid frequency estimation ($f_{sys}$) from a remote location including a control center of a Transmission Service Operator, via a communication channel.

7. A method according to claim 1, wherein the method is carried out at a remote location and said control action is sent to said output voltage controller via a communication channel.

8. A method according claim 1 further comprising, continuously determining an active throughput power and said output voltage of said at least one transformer so as to estimate a voltage dependence of a downstream load in said power grid.

9. A method according to claim 1 further comprising, controlling a plurality of transformers connected in parallel, whereby said control action to change the output voltage of said plurality of transformers is sent to said plurality of transformers at the same time, and wherein said method comprises the step of sending a synchronization signal to synchronize clocks of local output voltage controllers of power electronics converters of said plurality of transformers.

10. A method according to claim 1, wherein determining said grid frequency ($f_{meas}$, $f_{sys}$) comprises the step of determining a grid frequency at a plurality of different places in said power grid.

11. A computer program product comprising a computer program containing computer program code means arranged to cause a computer or a processor to execute all of the steps of a method according to claim 1, stored on a non-transitory computer-readable medium.

12. A control system for controlling an output voltage of at least one transformer in a power grid, wherein said at least one transformer comprises a power electronics converter thereby constitutes at least one power electronics enhanced transformer (PEET), and said control system comprises an output voltage controller and a sensor configured to determine a grid frequency of said power grid, and whereby said control system is configured to compare said determined grid frequency with a reference value, produce an error signal corresponding to the difference between said determined grid frequency and said reference value and apply said error signal as feedback to said output voltage controller, and cause said output voltage controller to generate a control action to change the output voltage of said at least one transformer comprising a power electronics converter to limit the difference between the grid frequency and the reference value, whereby said power electronics converter is an AC-AC converter that is connected to either a primary side or a secondary side of said a transformer, whereby said AC-AC converter has a first AC side and a second AC side and two terminals on said first AC side are connected in parallel to a winding or a part of a winding of said transformer, and said second AC side is connected directly to, or in series with an external circuit line, wherein said at least one PEET transformer has one of the following topologies:
   a) voltage terminals on said first AC side are connected in parallel to one of the windings of said transformer, whereby said transformer has two windings on a PEET-side of said transformer which are isolated from each other, and voltage terminals on said second AC side of said AC-AC converter are connected in series with said external circuit line,
   b) voltage terminals on said first AC side are connected in parallel to a part of the winding of said transformer and the voltage terminal on said second AC side of said AC-AC converter is connected directly to said external circuit line, wherein the winding is the only winding on a PEET-side of the transformer and said part of the winding is a portion that is less than an entirety of the winding.

13. A control method according to claim 12, wherein said power electronics converter has a rating that is smaller than total throughput power of a transformer of said at least one transformer.

14. A control system according to claim 12, wherein said AC-AC converter comprises a DC bus.

15. A control system according to claim 12, wherein said transformer comprises a plurality of windings that are isolated from each other.

16. A control system according to claim 12, wherein said power electronics converter comprises a phase-locked loop (PLL) configured to determine said grid frequency of said power grid by estimating a local power grid frequency ($f_{meas}$).

17. A control system according to claim 12, further comprising a communication channel configured to receive a power grid frequency estimation ($f_{sus}$) from a remote location including a control center of a Transmission Service Operator, and said control system is configured to determine said power grid frequency of said power grid using said power grid frequency estimation ($f_{sus}$).

18. A control system according to claim 12, further comprising a communication channel that is configured to receive said generated control action from a remote location including a control center of a Transmission Service Operator.

19. A control system according to claim 12, further comprising, an instrument that is configured to continuously measure an active throughput power and said output voltage of said at least one transformer, and said control system is configured to estimate a voltage dependence of a downstream load in said power grid using said measurements.

20. A control system according to claim 12, wherein the control system is configured to control the output voltage of a plurality of transformers that are connected in parallel and that comprise a power electronics converter, and said output voltage controller is configured to send said control action to change the output voltage of said plurality of transformers to said plurality of transformers at the same time, and wherein said control system is configured to send a synchronization signal to synchronize clocks of local output voltage controllers of power electronics converters of said plurality of transformers.

* * * * *